United States Patent
Kawabe et al.

[11] Patent Number: 5,985,069
[45] Date of Patent: Nov. 16, 1999

[54] METHOD OF MANUFACTURING A FLAT DISPLAY PANEL AND FLAT DISPLAY PANEL

[75] Inventors: Syouichi Kawabe; Masaaki Sasaka; Kouichi Murakami, all of Miyazaki, Japan

[73] Assignee: Fujitsu Limited, Kawasaki, Japan

[21] Appl. No.: 08/917,511

[22] Filed: Aug. 26, 1997

[30] Foreign Application Priority Data

Oct. 11, 1996 [JP] Japan .................................. 8-270134

[51] Int. Cl.$^6$ .............................. C03C 27/00; B05C 3/02; E06B 3/24
[52] U.S. Cl. .................................. 156/109; 65/43; 428/34
[58] Field of Search ........................ 118/315, 323, 118/410, 411, 412, 429, 684; 65/43, 60.1; 428/34; 156/109

[56] References Cited

U.S. PATENT DOCUMENTS

| | | | |
|---|---|---|---|
| 4,120,999 | 10/1978 | Chenel et al. | 428/34 |
| 4,262,036 | 4/1981 | Mineyama et al. | 427/64 |
| 4,800,837 | 1/1989 | Ferragni | 118/410 |

*Primary Examiner*—Michael W. Ball
*Assistant Examiner*—Robert Hendrix
*Attorney, Agent, or Firm*—Staas & Halsey LLP

[57] ABSTRACT

A method of manufacturing a flat display panel having first and second substrates assembled in spaced relationship with a gap therebetween and joined together by a band of sealing material, formed in a frame configuration which may be rectangular, on the surface of the first substrate and adhering the first and second substrates together. A paste of the sealing material is dispensed from a nozzle moved along a route from a starting point displaced the frame configuration, thereby forming a starting segment extending from the starting point to the frame, along the route of the rectangular frame configuration and forming a central segment, and from the frame and to the ending point thereby forming an ending segment integral with the central segment, the ending point being displaced from the frame configuration and from the starting point. In one embodiment, the starting and ending segments are tapered, from smaller dimensions at the starting and ending points to greater dimensions, common with the central segment dimensions, and angularly cross each other in overlapped relationship at intermediate positions along the lengths thereof so as to be joined together, at a location displaced from the frame. In another embodiment, the starting and ending segments are displaced laterally so as to extend in parallel and spaced relationship and are joined together by fusing of their contiguous side surfaces.

17 Claims, 5 Drawing Sheets

FIG. 8(a)    FIG. 8(b)    FIG. 8(c)

METHOD OF MANUFACTURING A FLAT DISPLAY PANEL AND FLAT DISPLAY PANEL

BACKGROUND OF THE INVENTION

1. Field of the Invention

The present invention relates to a method of manufacturing a flat display panel and the resulting flat display panel, such as a plasma display panel or a liquid crystal panel, and, more particularly, to such a panel formed by adhering together a pair of substrates having electrodes and spacers, etc. formed thereon and which are assembled with a predetermined space, or gap, therebetween and sealed together along the respective peripheries, or circumferential portions, thereof.

Such a flat display panel requires precision components of highly accurate dimensions and configurations, such that the respective, opposed surfaces of the substrates are planar throughout and provide a uniform space therebetween and such that the respective circumferential portions of the substrates are properly aligned to enable accurate coating of a sealing material therebetween for reliably sealing the two substrates together.

2. Description of the Related Art

Sealing of the spaced substrates of the flat display panel is performed by coating a selected one of the substrates adjacent the circumference thereof with an elongated and continuous band, or bead, of a sealing material consisting of glass paste, etc., and then adhering the one substrate to the other substrate with the sealing material.

Known methods of coating the sealing material onto the selected substrate include a silk screen process, using a screen mask, to apply the band of sealing material in a pattern defined by the mask and a dispensing technique wherein the sealing material is dispensed from a nozzle as the nozzle is moved about the circumferential portion of the selected substrate thereby to deposit a narrow band, or bead, of the sealing material along the circumferential portion of the selected substrate. Dispensing of the sealing material from a nozzle is recognized as a preferred coating method, since more effective for realizing precision coating accuracy while also affording high speed processing. Therefore, the technique of dispensing material from a nozzle is employed in producing a plasma display panel having a large size, e.g., greater than a diagonal measurement of 30 inches, such as is utilized in a wall-mounted type television receiver.

FIGS. 7(a) and 7(b) are a plan view and a cross-sectional view, respectively, of a plasma display panel 30 comprising a lower glass substrate 31 and an upper glass substrate 32 which have been sealed together about their respective peripheries, or circumferential portions, by a band of sealing material 33 applied by the nozzle dispensing technique. The plasma display panel 30 is assembled and sealed subsequently to completion of prior steps, such as the formation of respective sets of electrodes on the opposed planar surfaces of the two glass substrates 31, 32. More particularly, a glass paste is applied as the band of sealing material 33 along a route, or path, adjacent to the circumferential portion of a selected glass substrate 31 and then the two glass substrates 31, 32 are adhered together using the bead of glass paste sealing material 31.

In the case of applying the glass paste sealing material by the nozzle dispensing technique, the glass paste is stored in a cylinder and dispensed via a nozzle onto the glass substrate. In the related art, as shown in FIG. 7(a), the coating process, and the band of coating material deposited thereby, typically begins at a point C adjacent the circumference of the glass substrate 31 and proceeds about the circumference in a continuous path along the route indicated by the arrows, to an ending point beyond the starting point C, and thus overlapping a beginning portion of the band of sealing material 33.

The coated glass paste bead then is solidified through a baking process—i.e., a heat treatment is performed under the condition that the two sheets of glass substrates 31, 32 are stacked in assembled relationship. The two glass substrates 31, 32 thus are adhered together and the gap therebetween is sealed by fusing a bead of the sealing material 33 thereto, and which has been solidified by the heat treatment.

The space between the two sheets of glass substrates 31, 32 then is evacuated to a specified vacuum condition by exhausting the air out of a through hole formed at a predetermined position in one of the glass substrates 31, 32; moreover, a selected discharge gas is injected into the gap, or discharge space, between the glass substrates 31, 32 to complete the plasma display panel, as shown in FIG. 7(b).

To facilitate a clear understanding of the foregoing, the coating of the band of glass paste has been explained with reference to FIG. 7(a), which illustrates the application of the band to a circumferential portion of a selected one of the glass substrates 31, 32, while FIG. 7(b) illustrates the two spaced glass substrates 31, 32 in the assembled and adhered-together condition. In the assembled relationship shown in FIG. 7(b), the glass paste sealing material 33 is subjected to a heat treatment to complete the sealing; the baking, however, changes the thickness of the sealing material 33 relative to the initial size of the gap between the substrates 31, 32 at the time of coating the band of sealing material thereon and thus prior to the baking step.

According to the method of coating the sealing material explained above, the band of sealing material 33 is coated along a route which has the shape of a frame, i.e., a generally rectangular path, indicated by the arrow marks shown in FIG. 7(a). The ending portion of the route overlaps a starting portion of the route, extending from the starting position C; thus, an ending portion of the band overlaps the starting portion of the band of sealing material along a common portion of the route. As a result, the band of sealing material 33 is thicker in the overlapped portion than in the remaining portions.

Moreover, in the injection process and when initially starting the application, or coating, of the band of sealing material 33 onto the glass substrate along the specified route, the amount of sealing material dispensed from the nozzle varies, or fluctuates; therefore, controlling the initial amount of sealing material at, and in the vicinity of, the starting point C is very difficult.

FIGS. 8(a) to 8(c) are cross-sectional views showing different conditions, and corresponding amounts, of the sealing material while in a holding condition at an end of a dispensing nozzle 39. As the holding condition of the sealing material 33' in the nozzle 39, the sealing material 33' may be displaced interiorally of the nozzle 39, i.e., withdrawn from the end thereof, as shown in FIG. 8(b) or the sealing material 33' may project from the end of the nozzle 39, as shown in FIG. 8(c), relative to a normal holding condition of FIG. 8(a) in which the sealing material 33' is held at a position effectively flush with the end of the nozzle 39.

Coating of the band of sealing material 33' from the nozzle 39 onto the substrate surface is achieved by applying an increased pressure to a supply of the sealing material 33' stored in the dispenser; when the coating operation is suspended, the application of increased pressure is stopped and a drawing (i.e., decreased) pressure is applied to prevent drooping of the sealing material by gravity. However, the holding conditions may differ, as shown in FIGS. 8(a) to 8(c), depending on a change of viscosity of the sealing material 33' or a small amount of leakage of the sealing material 33'.

Under the normal condition of FIG. 8(a), coating of the band of sealing material 33' can be started under a predetermined condition; however, if the sealing material 33' is withdrawn into the inside of the nozzle as shown in FIG. 8(b), the start of coating is delayed and thus the actual coating start position on the substrate surface deviates from the predetermined position (e.g., the starting position C in FIG. 7(a)). Alternatively, if the sealing material 33' projects from the end part of the nozzle as shown in FIG. 8(c), an excessive amount of material is deposited at the coating start position.

As explained above, the coating start position and the condition of the sealing material 33' may vary and thus be unstable; further, the band extending along the route from the coating start position may be overlapped and crossed by a portion of the band which progresses to the coating end position along the same route, resulting in a non-uniform thickness of the coating material in the overlapped crossed portions.

Since the space between the two glass substrates is as small as several tens of μm and may range up to several hundreds of μm, if the thickness of the applied coating material fluctuates, or varies, even if by only a small amount, reliable sealing between the opposing planar surfaces of the two substrates cannot be achieved. Namely, if the coating thickness is reduced at one localized position, it will permit leakage of the discharge gas supplied in the space, or gap, between the substrates; conversely, if the coating thickness is increased, it will cause a crack or a break of one of the glass substrates.

It is therefore an object of the present invention to provide a flat display panel which is free of the above problems and, furthermore, never permits leakage of the discharge gas or the liquid crystal material received in the gap between the substrates and is not susceptible to crackage or breakage of the seal or of the substrates after the sealing process is completed.

SUMMARY OF THE INVENTION

To solve the problems explained above, the present invention provides a method of manufacturing a flat display panel formed by coating a band of the sealing material, dispensed from a nozzle onto a substrate in the shape of a frame produced by moving the nozzle in a route along the periphery, or circumferential portion, of one selected substrate and thereafter adhering the one substrate to the other substrate via the band of sealing material, wherein the coating end position of the nozzle for dispensing the sealing material is different from the coating start position and both are displaced from the frame-shaped coating route such that no portions of the coated band of sealing material are in an overlapping relationship at any position along the frame-shaped coating route.

According to the method of manufacturing a flat display panel of the present invention, since the start position of the nozzle for coating the band of sealing material is set to a point different from the nozzle end position, the segment of the band extending from the start position, for which the coating process is difficult to control, never overlaps the segments of the band along the route or extending to the end position.

Therefore, since fluctuations of the coating thickness on the plane of the substrate due, for example, to dispensing, or depositing, of undesired, thick amounts of the coating material can be controlled, reliable sealing can be realized, leakage of the discharge gas or liquid crystal material sealed in the gap between the two substrates can be prevented and generation of cracks and breakage of the sealing substrates can also be prevented.

BRIEF DESCRIPTION OF THE DRAWINGS

FIGS. 8(a) to 8(c) are a cross-sectional views showing the holding conditions of sealing material at an end part of the nozzle.

DESCRIPTION OF THE PREFERRED EMBODIMENTS

Figure 1A:
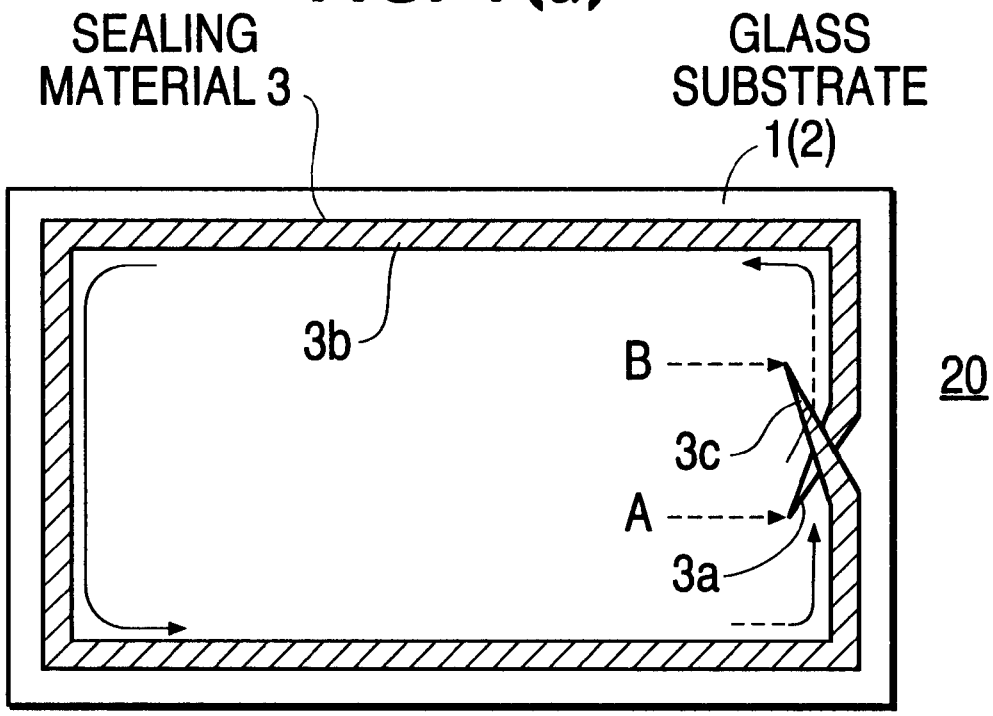
FIGS. 1(a) and 1(b) are a plan view and a cross-sectional view, respectively, of a display panel for explaining a first embodiment of the present invention.
Figure 1B:
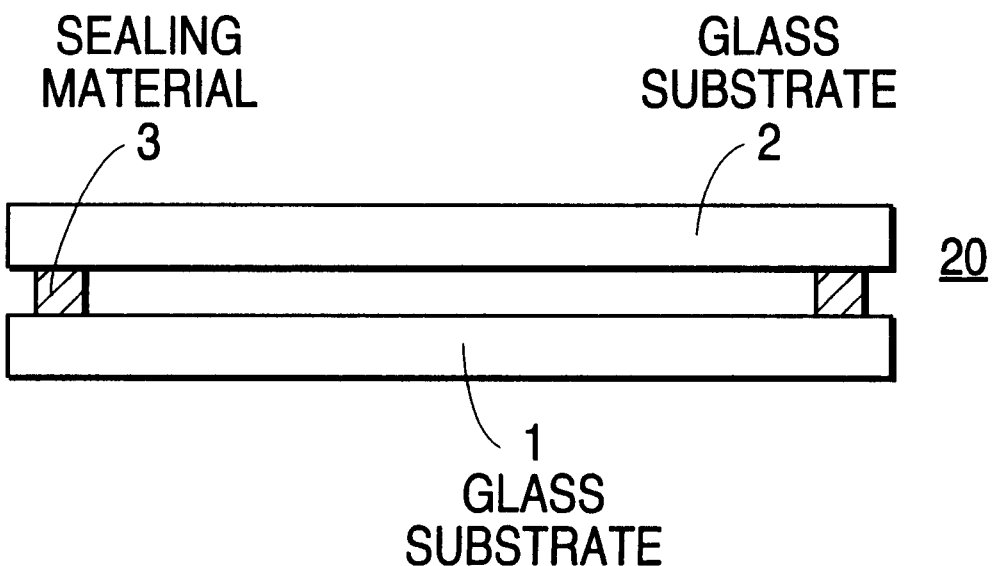
Figure 2:
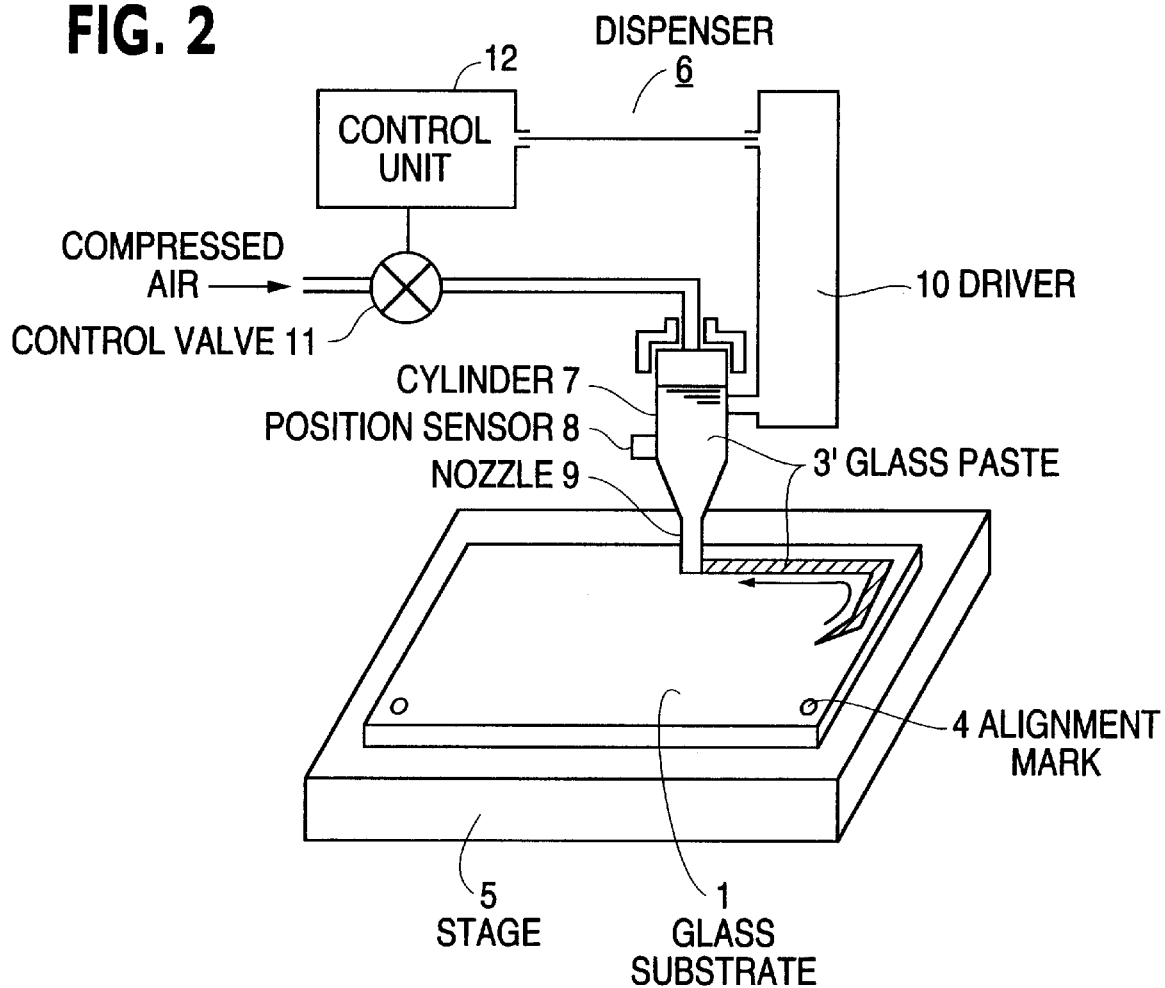
FIG. 2 is a diagram for explaining a method of manufacture of a display panel in accordance with the first embodiment of the present invention.

FIGS. 1(a) and 1(b) are a plan view and a cross-sectional view, respectively, of a plasma display panel 20 (hereinafter, "PDP") as a specific embodiment of a flat panel display formed in accordance with a first embodiment of the present invention. FIG. 2 is a diagram of apparatus employed in practicing the method of manufacturing the flat display panel in accordance with the first embodiment of the present invention.

More particularly, in the plan view of FIG. 1(a), the band of sealing material 3 is emphasized by cross-hatching in order to make it easier to understand the characteristics of the present invention. As is apparent from the cross-sectional view of FIG. 1(b), the PDP 20 comprises a pair of glass substrates 1, 2 disposed in spaced relationship with a gap therebetween and with respective sets of electrodes (not shown) on the corresponding, opposed surfaces thereof; the spacing therebetween may be maintained by spacer elements (not shown). The substrates are sealed together about their respective circumferences by the band of sealing material 3. As shown in FIG. 1(a), in this first embodiment, the band of sealing material 3 is coated in such a manner that the coating start position A is different from the coating end position B, thereby to overcome the overlapping problem and the resultant, varying thickness of the band of sealing material encountered in the related art.

Figure 7A:
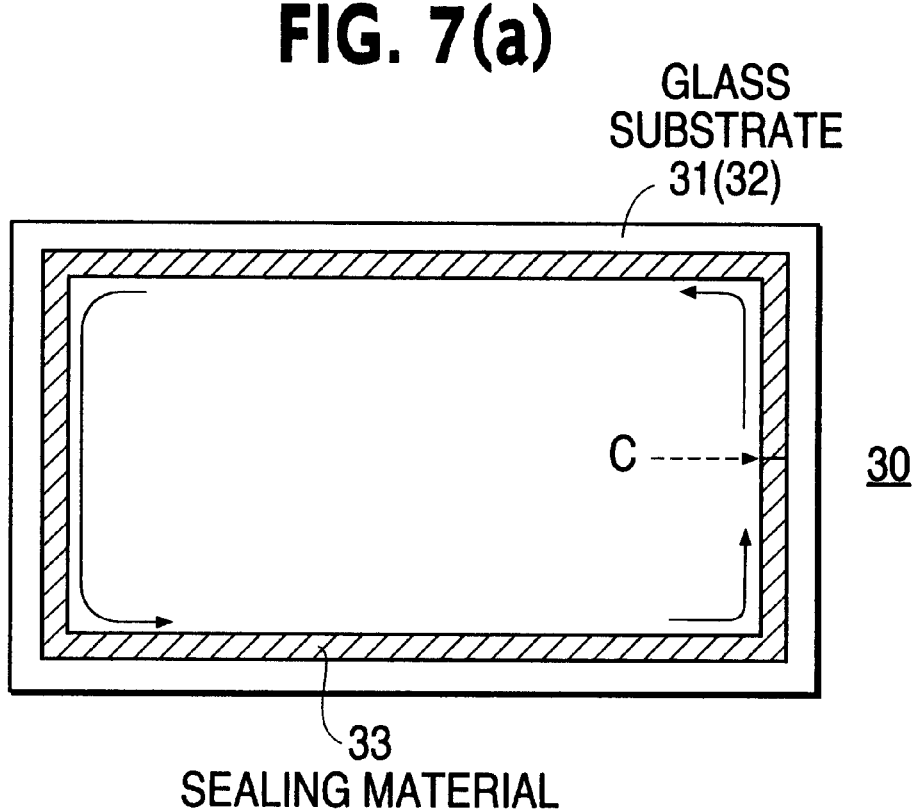
FIGS. 7(a) and 7(b) are a plan view and a cross-sectional view, respectively, of a flat display panel of the related art.
Figure 7B:
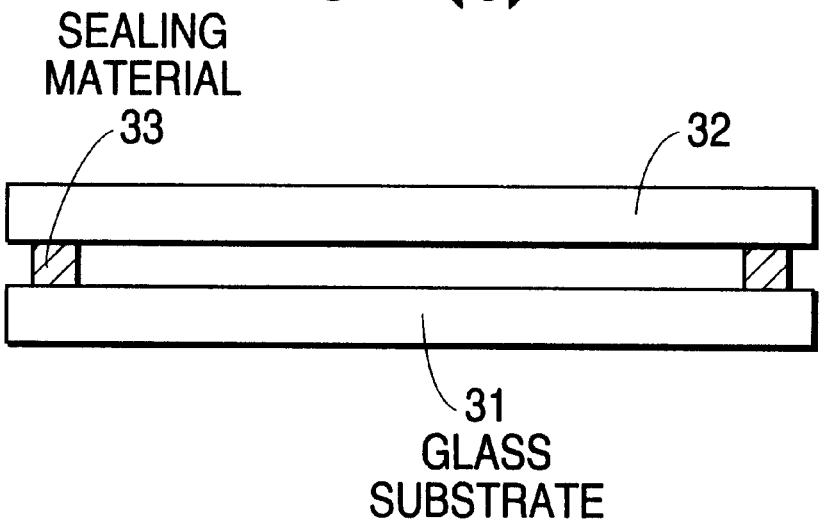

Namely, in the related art discussed above in relation to FIGS. 7(a) and 7(b), a starting portion, or segment, of the band of sealing material extending along the route from point C is overlapped by an ending portion, or segment, of the band of sealing material, producing the varying thickness of the resulting band in that overlapped portion of the route. By contrast, in the embodiment of the present invention shown in FIGS. 1(a) and 1(b), the band of sealing material 3 includes a starting portion, or segment, 3a, a central segment 3b and an ending segment 3c, the segments 3a, 3b and 3c being integral and thus forming a continuous band. The central segment 3b extending throughout most of the generally rectangular frame is of uniform thickness and width, the starting segment 3a extending from a starting point A to the central segment 3b and the ending segment 3c extending from the central segment 3b to the ending point B. As latter discussed, the band of sealing material 3 is reduced in thickness in the starting and ending segments 3a and 3c and, furthermore, the segments 3a and 3c overlap at a location displaced from the generally rectangular frame of the central segment 3b. Accordingly, by preventing overlap of the starting and ending portions of the band of sealing material 3 along the route, the unstable coating condition of the prior art as shown in FIGS. 7(a) and 7(b) is avoided and the thickness of the sealing material 3, as applied throughout the route, can easily be controlled so as to be of uniform thickness.

FIG. 2 is a diagram of illustrative equipment used in accordance with the first embodiment of a coating process in accordance with the invention, for applying the band of sealing material 3 to a selected glass substrate 1 of a PDP. The glass substrate 1 is placed on a stage 5 and the sealing material 3, e.g., a glass paste, is coated thereon by a dispenser 6. As discussed in relation to FIG. 1(b), the PDP 20 comprises a pair of glass substrates 1 and 2, namely, the front side glass substrate 1 and rear side glass substrate 2, on which respective sets of electrodes, etc. are formed by executing various processes such as sputtering, photolithography and screen printing, etc.; thereafter, these glass substrates 1, 2 are sealed about their respective circumferences by the band of sealing material 3, both to adhere same together in the assembled relationship and to seal the gas discharge space therebetween.

First, as shown in FIG. 2, the front side glass substrate 1, for example, is accurately placed at a predetermined position on the stage 5 with reference to the alignment mark 4 previously provided thereon. Coating of the band of sealing material 3 onto the glass substrate 1, once placed on the stage 5, is performed by a dispenser 6 comprising a cylinder 7 storing a supply 3' of the sealing material 3, a nozzle 9 which dispenses the sealing material 3' from an end thereof, a driver 10 which drives the cylinder 7 along a route, typically defining a generally rectangular frame adjacent the circumference of the substrate 1, as before discussed, and a control valve 11 adjusted by a control unit 12 for controlling a supply of compressed air to the interior of the cylinder 7 and thereby controlling the interior pressure thereof for forcing the glass paste sealing material 3' through the nozzle 9. In this embodiment, the supply of glass paste 3' including a solvent is stored in the cylinder 7 and the glass paste 3' is dispensed from the nozzle 9 by the compressed air supplied to, and thereby producing an increased pressure within, the cylinder 7, under control of the control unit 12. The control unit 12 adjusts the control valve 11 to establish the desired pressure within the cylinder 7 and thereby to produce the desired rate of discharge of the glass paste sealing material 3' from the nozzle 9, as the band of glass paste 3, onto the glass substrate 1.

After the glass substrate 1 is placed on the stage 5, the driver 10 is operated by the control unit 12, responsive to an instruction thereto, to move the cylinder 7 so that the end of the nozzle 9 is located at the coating start position of the route, shown by the point A in FIG. 1(a). In this case, the coating start position A is located interiorally of the generally rectangular frame-shaped coating route. The start position A, as thus disposed interiorally of the framed-shaped coating route, is selected such that the vacant space between the substrates, exterior of the frame-shaped coating route, does not interfere with any structures or other characteristics of the PDP.

Thereafter, the control unit 12 functions to open the control valve 11 thereby to supply compressed air to the cylinder 7, increasing the internal pressure therein and thereby starting the dispensing of the glass paste sealing material 3' from the end of the nozzle 9; the control unit 12 simultaneously activates the driver 10 to start movement of the cylinder 7 from the starting point A to, and along, the route, as indicated by the arrow marks. As shown in FIG. 1(a), when the cylinder 7 has completed the entire rectangular route along the circumference of the glass substrate 1, the cylinder 7 is moved from the rectangular route to, and stops at, the stop position B which likewise is interior of the rectangular frame-shaped route and which is different from the coating start position A. As seen in FIG. 1(a) and later discussed, both the starting segment 3a, extending from starting point A to the central segment 3b constituting the rectangular frame, and the ending segment 3c, extending from the central segment 3b to the ending point B, have tapered configurations and cross each other approximately mid-way of the length of each.

As will be explained later in detail, the nozzle 9 is provided with a position sensor 8 which detects the distance from the open end of the nozzle 9 to the surface of the glass substrate 1 and supplies a corresponding distance detection signal to the control unit 12 which, in turn, controls the height of the cylinder 7 thereby to maintain a constant distance between the end of nozzle 9 and the surface of the substrate; this corrects for variations or unevenness in the surface of the substrate on which the band of glass paste sealing material 3 is being deposited.

The amount of the glass paste sealing material 31, which is coated as the band 3 onto the substrate in FIG. 1(a), is caused to increase gradually along the length of the starting segment 3a, from the interiorally disposed starting point A to its integral juncture with the central segment 3b, resulting in the tapered configuration of the segment 3b, and such that when reaching the central segment 3b, the flow of the material has become stabilized and thereafter remains uniform. Thus, the central segment 3b of the band of sealing material 3, throughout the generally rectangular frame, is of substantially uniform width and thickness. Further, when the entire central segment 3b has been completed, the flow is gradually decreased as the nozzle is moved from the central segment 3b to the ending point B, producing the tapered ending segment 3c as seen in FIG. 1(a). Thus, the width and thickness dimensions of the material in the tapered starting segment 3a and in the tapered ending segment 3c are narrower and thinner at the crossing, intermediate segments thereof, than the corresponding dimensions of the central segment 3b forming the rectangular frame. The amount of glass paste material 3' in these starting and ending tapered segments 3a and 3c accordingly is controlled such that the respective combined thicknesses thereof at the respective crossed and overlapped portions thereof, and the individual thickness thereof, extending from the crossed and overlapped portions to the central segment 3b, are of the same uniform thickness as that of the central segment 3b. Further, in stopping the dispensing of the glass paste sealing material 3' from the nozzle 9, the control valve 11 is operated to produce a drawing pressure (i.e., pressure reduced relatively to ambient or atmospheric), rather than an ejection pressure (i.e., increased relatively thereto), thereby to eliminate the drooping of the glass paste sealing material 3 from the end of the nozzle 9 as seen in FIG. 8(c).

As explained above, after the band of glass paste sealing material 3 has been applied from the starting point A and throughout the rectangular frame and to the stopping point B, solvent included in the paste 3 is vaporized and solidified by baking the coated glass paste 3; thereafter, the front side glass substrate 1 and the rear side glass substrate 2 are stacked and are then fixed using clips, etc. The glass material of the sealing material is fused by a heat treatment under this condition and thereby the glass substrates 1, 2 are adhered. One glass substrate is provided with a through hole (not illustrated) through which the space between these glass substrates 1, 2 is evacuated to a vacuum condition. Thereafter, this space is filled with a discharge gas, such as neon, and the through hole then is closed to complete the assembly of the panel.

Figure 3:
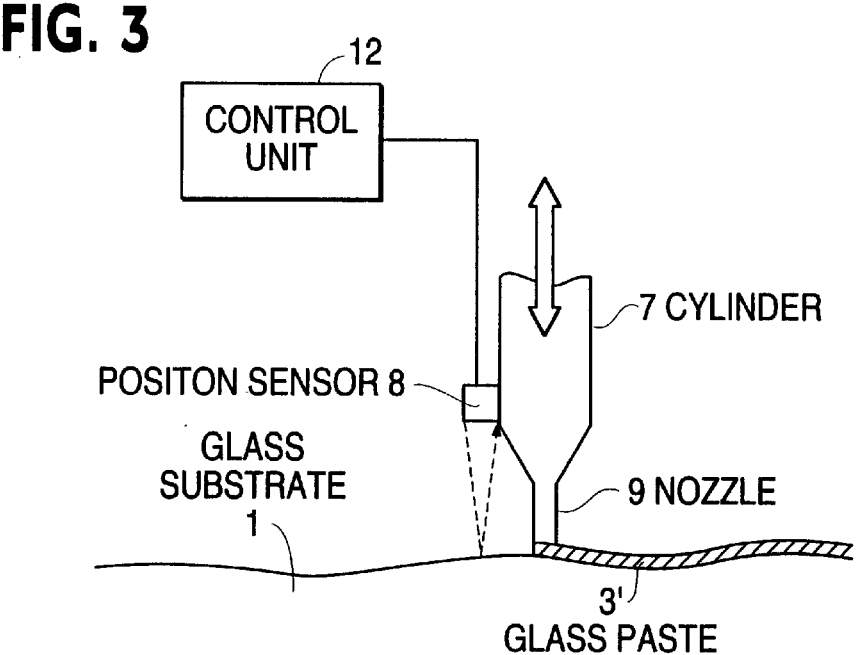
FIG. 3 is a cross-sectional view for explaining control of vertical movement of a dispensing nozzle in accordance with the first embodiment of the present invention.

FIG. 3 is a cross-sectional view for explaining the control of vertical movement of the nozzle 9 in the embodiment of the present invention as explained previously. The surface of the glass substrate 1 is not strictly planar but, instead and as a practical matter, tends to be uneven as shown in FIG. 3. For more accurate coating of the band of glass paste 3, the vertical position of nozzle 9 must be changed, depending on such unevenness, so as to have a fixed spatial relationship relatively to the substrate surface throughout the coating operation.

Therefore, a position sensor 8 which can detect the distance of the cylinder 7 relatively to the surface of the substrate by sensing the intensity of a reflected light beam is provided on the cylinder 7 at a leading position thereon relatively to the direction of movement along the route, thereby to detect any such unevenness on the surface of the glass substrate 1. Namely, the position sensor 8 comprises a light emitting section and a light receiving section (details not illustrated). The light beam is irradiated from the sensor 8, as indicated by a dotted line in FIG. 3, to the part of glass substrate 1 to be coated by the glass paste 3; unevenness of the glass substrate 1 is detected from the intensity of the reflected light beam, the latter indicated by the dotted line having an arrowhead and extending from the surface of the substrate 1 to the sensor 8. The position sensor 8 produces a detection signal which it sends to the control unit 12, which issues an instruction to the driver 10 (refer to FIG. 2), depending on the detection result of position sensor 8, to control the vertical position of the nozzle 9.

As explained above, the coating thickness of the band of glass paste 3 is kept constant by coating the glass paste 3' at a uniform rate while the nozzle 9 is moved vertically, as a function of and to compensate for unevenness of the surface of glass substrate 1.

The coating condition of the glass paste 3' also is adjusted, for example, so that the width of the glass paste band 3, parallel to the surface of the substrate and transversely to the direction of movement along the route, is set to a value of several mm and the thickness thereof, transverse to the surface of the substrate and to the width, is set to a fixed value of several hundreds of $\mu$m. However, the viscosity of the glass paste 3 changes slightly, depending on environmental conditions such as temperature and humidity. Therefore, the coating conditions can change, resulting in changes of the dimensions of the band, even though the injection pressure and speed and the spacing of the nozzle end from the surface of the substrate are maintained at constant pre-set values.

Accordingly, the band width and thickness along the rectangular frame route are periodically measured and, if these data deviate from the predetermined values, the coating conditions are changed. For instance, if the band width becomes wider than desired, the dispensing pressure is lowered and, if the band becomes thicker than desired, a gap between the end of the nozzle 9 and the surface of the substrate is increased. On the contrary, if the band width becomes narrower than desired or the thickness becomes less than desired, the respective, inverse adjustments are made.

For example, a dispensing pressure is set to several kgf/cm$^2$, a gap between the open end of the nozzle 9 and the surface of the glass substrate 1 is set to a valve of several hundreds $\mu$m, and a moving speed of the nozzle 9 relatively to the surface of the glass substrate 1 (which affects both the width and the coating thickness of the band) is set to several tens mm/sec. for establishing the nominal and desired uniform width and thickness dimensions of the band of glass paste sealing material deposited along the route.

Figure 4A:
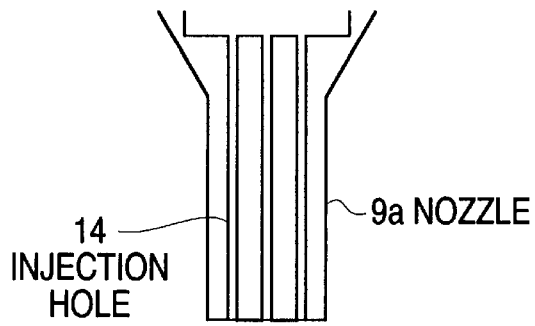
FIGS. 4(a) and 4(b) are cross-sectional views for explaining an embodiment of the dispensing nozzle.
Figure 4B:
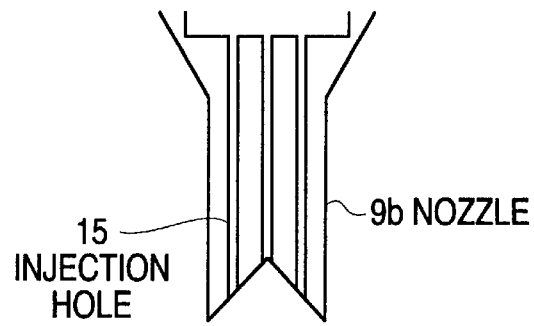

Moreover, it is also important to consider the structure of nozzle 9, particularly in the vicinity of the open, discharge end thereof, and to configure same appropriately to further stabilize and increase the accuracy of the coating function. FIGS. 4(a) and 4(b) cross-sectional views of alternative nozzle embodiments in accordance with the invention, which are consistent with this further objective.

First, FIG. 4(a) shows a nozzle 9a having a flat end portion comprising a plurality of injection holes of small diameter extending along the interior thereof in parallel axial relationship. According to such nozzle 9a, the glass paste (not shown) pushed from the cylinder 7 by the predetermined gas pressure is diffused and dispersed as a uniform thickness flat layer from the plurality of dispensing holes 14 at the open end of the nozzle 9a and onto the surface of the substrate. In comparison with a conventional nozzle having a single dispensing hole of a large diameter, a nozzle having plural dispensing holes 14 as in FIG. 4(a) affords greatly improved control and accuracy of the width and thickness of the glass paste sealing material band deposited along the coating route on the substrate.

FIG. 4(b) shows a nozzle 9b in accordance with a further embodiment of the invention wherein the end thereof has a groove or notch formed therein of a concave configuration, relatively to the surface of a substrate onto which the glass paste is to be discharged, and further having a plurality of dispensing holes 15 of small diameter and extending in parallel axial relationship, as in the case of FIG. 4(a). In use of the nozzle 9b, the glass paste dispensed from the holes 15 is reserved, or held, in the grooved, or notched, portion of the end, throughout the discharge operation.

In the case of the nozzle 9a having the flat end portion shown in FIG. 9(a), the discharged glass paste sometimes diffuses up the side surfaces of nozzle but, in the case of the nozzle 9b, up-diffusion of glass paste along the side surfaces is prevented, improving the coating accuracy such as the width of the band. Moreover, with a drawing pressure for preventing drooping of the glass paste after the coating, the glass paste adhered to the end of the nozzle is concentrated in the center of the groove portion and thereby drooping of the glass paste can be prevented more reliably.

The dispenser 6 shown in FIGS. 2 and 3 is only an illustrative embodiment and is subject to modification; for example, it is also possible to form the nozzle 9 separately from the cylinder 7. Thus, the present invention is not limited to the specific embodiment illustrated herein.

Next, a second embodiment of the present invention will be explained with reference to FIG. 5.

Figure 5:
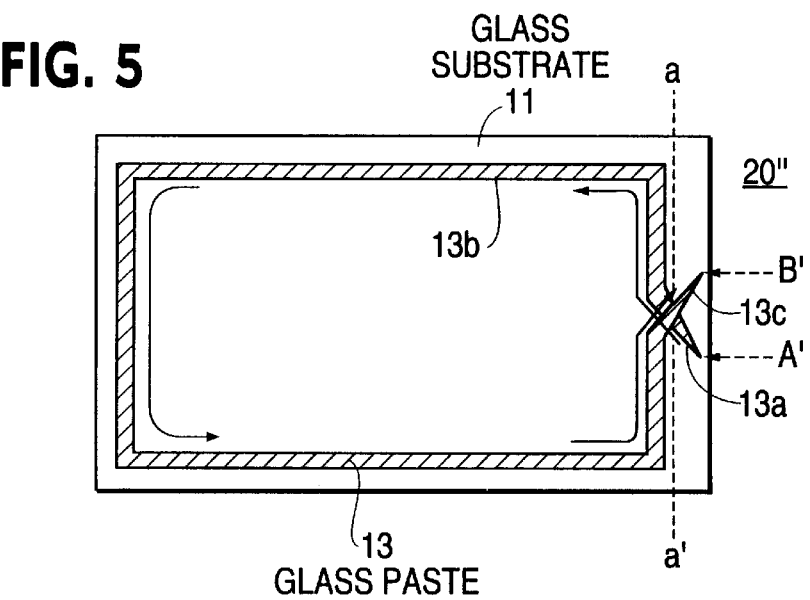
FIG. 5 is a plan view of a substrate for explaining a second embodiment of the present invention.

FIG. 5 is a plan view of a substrate 11 for explaining the second embodiment of the present invention, showing the condition that the circumferential portion of a glass substrate 11 of a PDP 20" is coated with a band of the glass paste sealing material 13.

Coating of the glass paste 13 is performed using a dispenser similar to that used in the first embodiment of FIG. 2, but the coating route in this second embodiment is changed from that used in the first embodiment. Namely, as shown in FIG. 5, the glass paste coating start position and end position are set at the inside of the frame-shaped coating area in the first embodiment but, in the second embodiment, the coating start position A' and end position B' are located at respective positions exterior of the frame-shaped coating route, or area. More particularly, the starting and ending points A' and B' in the embodiment of FIG. 5 are located in a peripheral portion of the substrate 11, which extends from line a—a' to the parallel edge of the substrate 11 (and thus to the right as seen in FIG. 5), and which constitutes an unwanted or unneeded portion of the substrate. The starting and ending segments 13a and 13c of the band of sealing material 13 thus extend between the starting and ending points A' and B' and the uniform thickness, central segment 3b of the generally rectangular frame-shaped coating. Therefore, the entire region of the glass substrate surface area bounded by the rectangular frame route of the glass paste band 13 can be used effectively as a display area in accordance with this embodiment of the invention, since not encumbered by the starting and ending band segments 13a and 13c. After the band of glass paste 13 is fully coated, and as explained above, the PDP panel can be completed by sealing the front side glass substrate and the read side glass substrate together, as in the case of the first embodiment.

A flat display panel, such as a PDP, tends to be adopted for use as a large size display screen, such as type 40 display screen and a type 42 display screen (respectively of 40 inches and 42 inches diagonal dimensions). Therefore, it is desired to reduce the difference between the size of the display screen portion and the external size of the panel as a whole, namely, to reduce the size of any peripheral non-display region surrounding the useable display screen. The second embodiment of the invention according is very effective in satisfying such a requirement.

Figure 6:
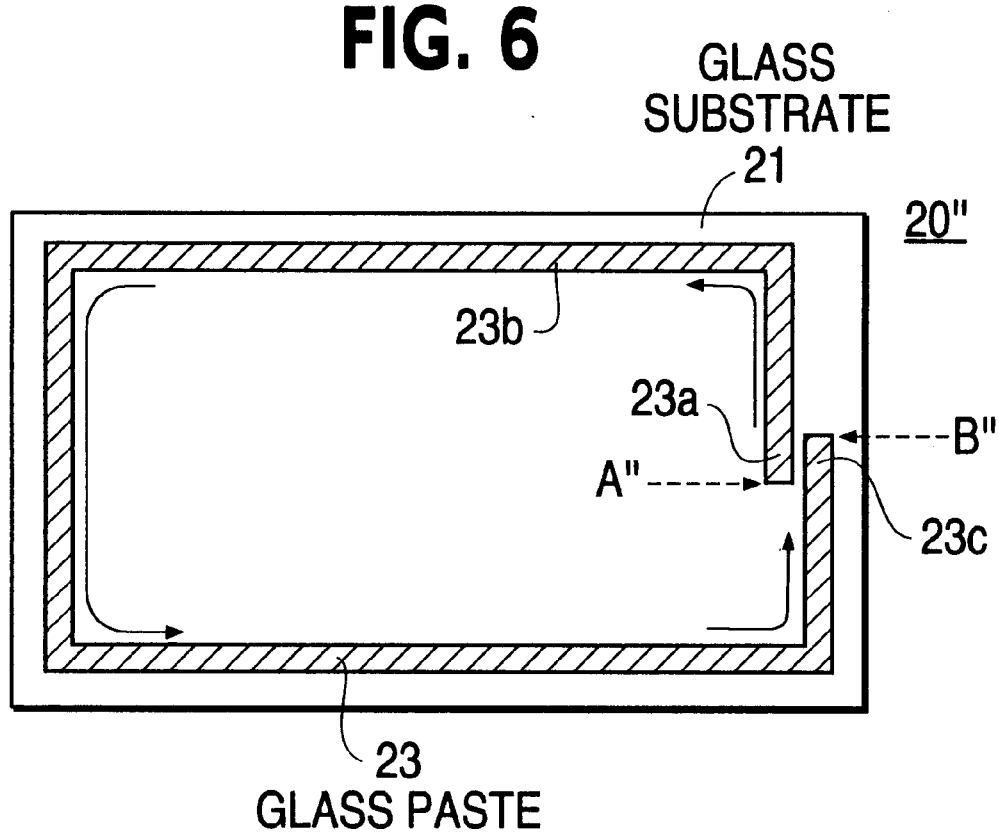
FIG. 6 is a plan view of a substrate for explaining a third embodiment of the present invention.
Figure 6:
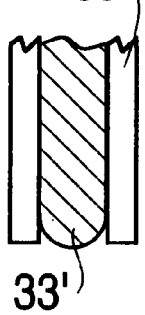
Figure 6:
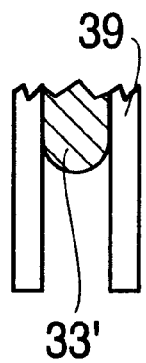
Figure 6:
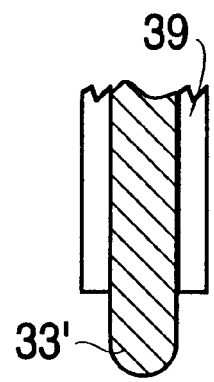

Next, the third embodiment of the present invention will be explained with reference to FIG. 6. FIG. 6 is a plan view of a substrate 21 in accordance with the third embodiment of the present invention, showing the condition that the circumference of the glass substrate 21, used for a PDP panel 20", is coated with a band of the glass paste sealing material 23.

The dispenser 6 of FIG. 2 also may be used in this embodiment, as in the case of the first embodiment, but coating of the band of glass paste 23 is performed along the somewhat different route indicated by the arrow marks shown in FIG. 6 Particularly, a starting segment 23a extends from starting point A" to the uniform route segment 23b of the band and the latter extends around substantially the entirety of the rectangular frame route to an ending segment 23c which, in turn, extends to the ending point B'. In this embodiment, while the ending segment 23c extends beyond the starting point A of the starting segment 23a in the area adjacent the right border of the substrate 21 as seen in FIG. 6, they are offset from each other in parallel, spaced relationship.

Thereafter, the band of glass paste 23, coated as explained above, is solidified by the baking process and the solidified glass paste 23 is fused by executing the heat treatment process under the condition that the other glass substrate (not illustrated) is stacked on the illustrated glass substrate 21. The gap between the starting and ending segments 23a and 23c is bridged by fusing the, glass paste of the adjacent sidewalls of the segments 23a and 23c by the heat treatment, thereby sealing the illustrated glass substrate to the other (not illustrated) glass substrate.

As in the case of the first embodiment, the inside space between the substrates is evacuated through a previously provided through hole (not shown) and neon gas then is supplied through the through hole to the interior space and the panel is finally sealed to complete the assembly of the panel.

According to this embodiment, since the band of glass paste 23 can be coated without providing the overlap area and it is fused to provide the connecting area at the time of sealing, the resulting glass paste band is of a uniform thickness and width, affording highly accurate sealing.

In each embodiment explained above, for convenience of illustration, the glass paste sealing material is shown as coated on the circumferential portion of a front side substrate and the starting and ending positions of the band are located at a common end of that substrate. However, the invention is not so limited and, instead, the band of glass paste sealing material instead may be coated on the rear side glass substrate. Further, the starting and ending positions of the band may be located at alternative positions than those illustrated, on either the front or the rear substrate. Moreover, each embodiment of the invention is applicable for use as a liquid crystal panel as well as a PDP or any other type of flat display panel, with regard to the sealing of the opposed pair of substrates together so as to achieve the benefits of the invention.

Accordingly, those of skill in the art will appreciate that the method of the invention and the resulting structures afford a flat panel display in which a band of glass paste sealing material may be applied by a dispensing type coating method and apparatus while achieving uniform width and thickness of the deposited band of material, thereby to assure proper sealing together of the pair of spaced substrates. Further, the resulting structure avoids leakage of discharge gas or liquid crystal material from within the space and, as well, avoids the generation of cracks or breaking of the substrate.

Numerous modifications and adaptations of the method and resulting structures of the invention will be apparent to those of skill in the art and thus it is intended by the appended claims to cover all such modifications and adaptations which fall within the true spirit of the scope of the invention.

What is claimed is:

1. A method of manufacturing a flat display panel of first and second substrates, each substrate having a main surface, the method comprising the steps of:

dispensing, from a nozzle and onto the main surface of the first substrate, a continuous band of a sealing material paste extending from a starting position to, and along, a route having a configuration defining a frame, and to an ending position displaced from the starting position and from the frame, the band comprising a starting segment extending from the starting position to the frame, a central segment integral with the starting segment and comprising the frame and an ending segment extending integrally from the central segment to the ending position, the starting and ending segments having no overlapping relationship on the route defining the frame;

assembling the first and second substrates with the main surface of the second substrate spaced by a gap from the main surface of the first substrate and engaging the continuous band of sealing material paste; and adhering the first substrate to the second substrate via the continuous band of sealing material paste.

2. The method of manufacturing a flat display panel according to claim 1, wherein the dispensing step further comprises:

locating the starting and ending positions interiorally of the frame; and overlapping the ending segment in crossing relationship with the starting segment, at intermediate positions of respective lengths of the ending and starting segments, and thereby sealing the gap, as surrounded by the frame, between the spaced main surfaces of the first and second substrates.

3. The method of manufacturing a flat display panel according to claim 1, wherein the dispensing step further comprises:

locating the starting and ending positions exteriorally of the frame; and overlapping the ending segment in crossing relationship with the starting segment, at intermediate positions of respective lengths of the ending and starting segments, and thereby sealing the gap, as surrounded by the frame, between the spaced main surfaces of the first and second substrates.

4. The method of manufacturing a flat display panel according to claim 1, wherein:

the dispensing step further comprises locating the starting and ending positions such that the corresponding starting and ending segments of the continuous band have respective, adjacent sidewalls thereof in closely spaced, parallel relationship; and the adhering step further comprises sealing the gap, as surrounded by the frame, between the spaced main surfaces of the first and second substrates by extending the respective sealing materials of the starting and ending segments at the adjacent sidewalls thereof into sealing contact with each other.

5. The method of manufacturing a flat display panel according to claim 1, further comprising ending the dispensing of the sealing material paste from the nozzle before the nozzle has moved to the ending position.

6. The method of manufacturing a flat display panel according to claim 2, further comprising ending the dispensing of the sealing material paste from the nozzle before the nozzle has moved to the ending position.

7. The method of manufacturing a flat display panel according to claim 3, further comprising ending the dispensing of the sealing material paste from the nozzle before the nozzle has moved to the ending position.

8. The method of manufacturing a flat display panel according to claim 4, further comprising ending the dispensing of the sealing material paste from the nozzle before the nozzle has moved to the ending position.

9. The method of manufacturing a flat display panel according to claim 1, wherein the dispensing step further comprises:

maintaining the nozzle in a vertical orientation relatively to a horizontal position of the main surface of the first substrate while moving the nozzle from the starting position, along the route and to the ending position, and simultaneously moving the nozzle vertically, relatively to the horizontal position of the main surface of the first substrate, so as to maintain a fixed distance between an open, dispensing end of the nozzle and the main surface of the first substrate.

10. The method of manufacturing a flat display panel according to claim 2, wherein the dispensing step further comprises:

maintaining the nozzle in a vertical orientation relatively to a horizontal position of the main surface of the first substrate while moving the nozzle from the starting position, along the route and to the ending position, and simultaneously moving the nozzle vertically, relatively to the horizontal position of the main surface of the first substrate, so as to maintain a fixed distance between an open, dispensing end of the nozzle and the main surface of the first substrate.

11. The method of manufacturing a flat display panel according to claim 3, wherein the dispensing step further comprises:

maintaining the nozzle in a vertical orientation relatively to a horizontal position of the main surface of the first substrate while moving the nozzle from the starting position, along the route and to the ending position, and simultaneously moving the nozzle vertically, relatively to the horizontal position of the main surface of the first substrate, so as to maintain a fixed distance between an open, dispensing end of the nozzle and the main surface of the first substrate.

12. The method of manufacturing a flat display panel according to claim 4, wherein the dispensing step further comprises:

maintaining the nozzle in a vertical orientation relatively to a horizontal position of the main surface of the first substrate while moving the nozzle from the starting position, along the route and to the ending position, and simultaneously moving the nozzle vertically, relatively to the horizontal position of the main surface of the first substrate, so as to maintain a fixed distance between an open, dispensing end of the nozzle and the main surface of the first substrate.

13. The method of manufacturing a flat display panel according to claim 5, wherein the dispensing step further comprises:

maintaining the nozzle in a vertical orientation relatively to a horizontal position of the main surface of the first substrate while moving the nozzle from the starting position, along the route and to the ending position, and simultaneously moving the nozzle vertically, relatively to the horizontal position of the main surface of the first substrate, so as to maintain a fixed distance between an open, dispensing end of the nozzle and the main surface of the first substrate.

14. The method of manufacturing a flat display panel according to claim 1, further comprising:

regulating the amount of sealing material paste dispensed from the nozzle so that the starting segment has a tapered configuration, increasing from a minimum size at the starting position to a common size of the central segment, the central segment of the band defines the frame and the ending segment has a tapered configuration, decreasing from a common size of the central segment to a minimum size at the ending position.

15. The method of manufacturing a flat display panel according to claim 1, further comprising:
controlling the amount of sealing material paste dispensed from the nozzle so as to form a band of sealing material of substantially uniform cross sectional dimensions throughout the continuous length thereof, from the starting position to the ending position.

16. The method of manufacturing a flat display panel according to claim 1, wherein the dispensing step further comprises locating the route having the configuration defining a frame along a circumferential portion of the main surface of the first substrate.

17. The method of manufacturing a flat display panel according to claim 1, wherein the adhering step comprises a heat treatment step.

* * * * *